United States Patent [19]

Norman et al.

[11] 3,772,150

[45] Nov. 13, 1973

[54] PROCESS FOR PRODUCING VITAMIN $D_3$ METABOLITE

[75] Inventors: Anthony W. Norman, Riverside; James F. Myrtle, Richmond; Ronald J. Midgett, Sunnymead; Henry G. Nowicki, Riverside, all of Calif.

[73] Assignee: The United States of America as represented by the Secretary of the Department of Health Education and Welfare, Washington, D.C.

[22] Filed: Dec. 29, 1971

[21] Appl. No.: 213,744

[52] U.S. Cl.................................................. 195/51 R
[51] Int. Cl....................... C12d 5/00, C07c 171/10
[58] Field of Search................................. 195/51 R

[56] References Cited
UNITED STATES PATENTS

| | | | |
|---|---|---|---|
| 3,565,924 | 2/1971 | De Luca et al. | 195/51 R |
| 3,094,465 | 6/1963 | Nishikawa et al. | 195/51 R |

*Primary Examiner*—Alvin E. Tanenholtz
*Attorney*—John C. Holman et al.

[57] ABSTRACT

A method of making a rapidly acting polar metabolite of Vitamin $D_3$ in vitro by digesting 25-hydroxycholecalciferol with a mitochondrial preparation of kidney tissues.

10 Claims, No Drawings

PROCESS FOR PRODUCING VITAMIN D3 METABOLITE

This invention relates to steroids, and more particularly this invention relates to a polar metabolite of cholecalciferol.

Vitamin D was isolated in 1924 and characterized as an antirachitic factor. Since that time, Vitamin D has been generally considered a major factor in regulating calcium absorption and bone metabolism. For a considerable period of time thereafter little was known about Vitamin D, although many diseases and other physiological problems were attributed to Vitamin D.

More recent research, however, has shown that Vitamin D produces its effects through a metabolic route. Through various isotopic labeling methods, and purification methods, it was determined that the effects of Vitamin D were centered in a metabolite of Vitamin $D_3$.

The results of numerous studies have led to the hypothesis that the steroid cholecalciferol (Vitamin $D_3$) acts through the activation of the expression of genetic information, in a manner analogous to steroid hormones such as estrogen and testosterone. However, it seems certain that cholecalciferol must first be converted to a new polar form prior to the stimulation of intestinal calcium transport. There are a large number of pathological conditions which might be due to abnormalities in cholecalciferol metabolism, such as the osteomalacia and hypocalcema associated with uremia, Vitamin D-resistant rickets, and glucocorticoid antagonism of Vitamin D action. Similarly, the apparent abnormal sensitivity to cholecalciferol found in sarcoidosis could also be related to a defect in cholecalciferol metabolism.

There has been isolated a polar metabolite of cholecalciferol from porcine serum identified as 25-hydroxycholecalciferol. It has been reported to be the "active form" of cholecalciferol. This steroid is 1.4 times as active as cholecalciferol in curing rickets, as measured by the rat line test. In addition, 25-hydroxycholecalciferol was not only more active in stimulating intestinal calcium transport and elevating serum calcium in the rat, but the response was elicited somewhat more rapidly.

Concurrent with this work it was also found that in the intestinal mucosa of the chick a single, biologically active polar metabolite of cholecalciferol, designated metabolite 4B, was selectively localized within the nucleus by way of a nuclear receptor protein. 15 hours after the intracardiac administration of a physiological dose of 10 I.U. of cholecalciferol, the bulk of the radioactivity exists in the plasma, liver, and intestine exists as three polar metabolites. These are designated metabolites 4A, 4B, and 4C on the basis of their chromatographic mobility on silicic acid columns. Metabolite 4A from both intestine and plasma has biological and chromatographic properties identical with 25-hydroxycholecalciferol, but it has not yet been chemically verified that metabolite 4A is 25-hydroxycholecalciferol. In the intestine the majority of the radioactivity is present in the form of metabolite 4B. Moreover, 25-hydroxycholecalciferol isolated from the blood was shown to be an intermediate in the formation of this nuclear metabolite. Recently, it was also confirmed that 25-hydroxycholecalciferol is not the major form of chlecalciferol in the intestinal mucosa nucleus.

It has now been found that metabolite 4B, and not 25-hydroxycholecalciferol, is the most likely candidate for the active form of cholecalciferol in the intestine.

White Leghorn cockerels (1 day old) were placed on a cholecalciferol-deficient diet and were used during their fourth week. At this time they were severely rachitic. Groups of 100 to 600 rachitic chicks were dosed intracardially with generally labeled ($^3$H)-cholecalciferol (50 international units (I.U.)). One international unit of cholecalciferol (Vitamin $D_3$) is equal to 0.025 μg or 0.065 nmole. The minimum daily requirement for cholecalciferol in the chick is 10 to 20 I.U. 24 hours later, metabolites 4A and 4B were isolated from the blood and intestine, respectively. Metabolites 4A and 4B, along with standard amounts of crystalline cholecalciferol and 25-hydroxycholecalciferol, were then examined for biological activity by the in vivo intestinal calcium transport assay of Coates and Holdsworth (Brit. J. Nutr. 15, 131 (1961).), as modified by Hibberd and Norman (Biochem. Pharmacol. 18, 2347 (1969).). In this assay, 24 hours after oral or intracardiac administration of the compound being tested, 2.0 mg of a mixture of radioactive and nonradioactive $Ca^{2+}$ (10 μc) is placed in an exposed duodenal loop. 30 minutes later, the appearance of $^{45}Ca^{2+}$ in the plasma is determined (Table 1). All compounds examined were dissolved in 0.2 ml of 1,2-propanediol and administered orally. Controls received 0.2 ml of 1,2-propanediol. In each assay, standard amounts of cholecalciferol were also assayed. The radioactive metabolites 4A and 4B were administered at varying doses. The exact amount of metabolite in each dose was determined from the specific activity of the parent cholecalciferol from which they were derived and from the assumption that no tritium was lost in the metabolic conversion. For generally labeled ($^3$H)-cholecalciferol this assumption is valid. The 25-hydroxycholecalciferol was administered at various doses for determination of its intestinal biological activity by defining 1.0 I.U. as

TABLE 1

| Compound | Dose (I.U.) | $^{45}Ca^{2+}$ (count/min. per 0.2 ml. of plasma) |
|---|---|---|
| Control | [a] 0 | 157±9 |
| Cholecalciferol | [a] 2.3 | 185±15 |
| Do | [a] 5.7 | 217±14 |
| Metabolite 4B | [a] 4.1 | 228±21 |
| Control | [b] 0 | 70±10 |
| Cholecalciferol | [b] 2.6 | 97±10 |
| Do | [b] 5.2 | 142±33 |
| Do | [b] 10.4 | 205±31 |
| Do | [b] 20.8 | 297±66 |
| Metabolite 4B | [b] 3.1 | 302±10 |
| Metabolite 4A | [b] 5.2 | 208±47 |
| Control | [c] 0 | 110±21 |
| Cholecalciferol | [c] 1.3 | 142±20 |
| Do | [c] 2.6 | 214±17 |
| Do | [c] 5.2 | 167±13 |
| Do | [c] 10.4 | 279±14 |
| Do | [c] 20.8 | 538±72 |
| Metabolite 4B | [c] 1.9 | 258±21 |
| Metabolite 4A | [c] 1.5 | 181±36 |
| Do | [c] 3.0 | 225±23 |
| Do | [c] 6.1 | 358±65 |
| 25-hydroxycholecalciferol | [c] 1.7 | 198±40 |
| Control | [d] 0 | 163±18 |
| Cholecalciferol | [d] 1.3 | 158±28 |
| Do | [d] 2.6 | 213±18 |
| Do | [d] 5.2 | 329±94 |
| Do | [d] 10.3 | 311±34 |
| Do | [d] 20.7 | 555±49 |
| Do | [d] 500 | 791±99 |
| Metabolite 4B | [d] 1.8 | 345±42 |
| 25-hydroxycholecalciferol | [d] 5.0 | 328±53 |

[a] Assay 1.   [b] Assay 2.   [c] Assay 3.   [d] Assay 4.

equivalent to 0.025 μg. Metabolites 4A and 4B and 25-hydroxycholecalciferol were considerably more active than cholecalciferol in stimulating intestinal calcium transport. If the response obtained from a known amount of metabolite is compared with the amount of hydroxycholecalciferol required to elicit an equivalent transport response, the result can be expressed in terms of a relative biological activity (Table 2). Metabolite 4A and 25-hydroxycholecalciferol are both approximately two times as active as cholecalciferol in stimulating intestinal calcium transport. However, metabolite 4B is even more active, averaging 4.7 times the activity of cholecalciferol.

Clearly, metabolite 4B is highly active in initiating intestinal calcium transport but so is 25-hydroxycholecalciferol. If metabolite 4B is the active form of cholecalciferol in the intestine and 25-hydroxycholecalciferol an intermediate in its formation, then metabolite 4B should act considerably faster than either cholecalciferol or its 25-hydroxy derivative, since the latter steroids would have to undergo an obligatory metabolic conversion before becoming biologically effective. For comparison of rates of action of these compounds, the ability of 10 I.U. of cholecalciferol and 25-hydroxycholecalciferol to stimulate intestinal calcium transport was measured as a function of time after intracardiac administration. In addition, 50 and 500 I.U. of cholecalciferol were measured at three time periods. After an initial lag, 10 I.U. of cholecalciferol produced a maximum stimulation between 24 and 48 hours after administration. The 25-hydroxy derivative acted only slightly faster than the parent cholecalciferol, and the maximum increase attained was only somewhat greater. Cholecalciferol (50 or 500 I.U.) reduced the lag slightly further and produced maximum stimulation around 48 hours.

The steroids were also administered orally, and the action of 1.8 I.U. of metabolite 4B was compared with 5 I.U. of both cholecalciferol and its 25-hydroxy derivative. After a considerable lag, both cholecalciferol and 25-hydroxycholecalciferol produced a maximum increase in calcium transport at around 24 hours. The response to metabolite 4B was remarkably different. The lag in stimulation of $Ca^{2+}$ transport, while still present, was considerably shorter, and maximum stimulation occurred at approximately 9 hours. Moreover, the maximum $Ca^{2+}$ transport response produced by 1.8 I.U. of metabolite 4B far exceeded the maximum response obtained with 5 I.U. of either cholecalciferol or 25-hydroxycholecalciferol. The stimulation of 1.8 I.U. of metabolite 4B attained after 9 hours is approximately 78 percent of the total response obtained from 500 I.U. of cholecalciferol after 24 hours. Comparison of the response of metabolite 4B at 9 hours with the response obtained from standard amounts of cholecalciferol at 24 hours indicates that metabolite 4B is over 13 times as active as cholecalciferol.

These results demonstrate the occurrence of an extremely potent polar form of cholecalciferol, metabolite 4B. At the time of the initiation of the physiological response, this is the only metabolite of cholecalciferol found in the nucleus of the chick intestinal mucosa cell. This nuclear-bound metabolite is found in the intestine when either radioactive cholecalciferol or 25-hydroxycholecalciferol is administered. Metabolite 4B is also

TABLE 2

The biological activities of metabolites 4B and 4A and 25-hydroxycholecalciferol, relative to an equal amount of cholecalciferol. These results are calculated from the data given in Table 1 which reports the intestinal transport response obtained 24 hours after oral administration of the metabolites. For each experiment in Table 1, a standard curve of response versus amount of administered cholecalciferol was prepared. Then the responses of the test compund and cholecalciferol were compared to determine a relative biological activity. Values are the means ± the standard error of the mean. Numbers in parentheses indicate the total number of separate determinations

| Compound tested | Relative activity |
| --- | --- |
| Metabolite 4B (intestine) | 4.74±1.00 |
| Metabolite 4A (blood) | *2.04±0.13 |
| 25-hydroxycholecalciferol | **1.78±0.23 |

*Includes one additional assay not included in Table 1.
** Includes three additional assay not included in Table 1.

present in the intestine of the rat, pig, and several other species. The fact that metabolite 4B acts considerably faster than 25-hydroxycholecalciferol in stimulating calcium transport is consistent with the finding that 25-hydroxycholecalciferol is an intermediate in the formation of intestinal metabolite 4B.

Metabolite 4B appears to be the most potent form of cholecalciferol, in terms of stimulating intestinal calcium transport. On the basis of these results and other studies, it can be concluded that metabolite 4B is the active form of cholecalciferol in the intestine. However, confirmation of this through further biological and chemical characterization is rendered very difficult due to an apparent control of the amount of metabolite 4B found in the intestine. Administration of massive amounts of cholecalciferol does not increase the amount of metabolite 4B found in the intestine above approximately 0.2 I.U. (0.005 μg) per chick intestine. In addition, it remained to be determined whether metabolite 4B is activate in other cholecalciferol target tissues such as bone or whether it will be effective in alleviating any of the abnormalities in calcium metabolism discussed earlier. Until metabolite 4B was characterized and synthesized, these questions could only remain unanswered.

Accordingly, it is a primary object of the present invention to provide a method for the in vitro synthesis of metabolite 4B.

It is another primary object of the present invention to characterize metabolite 4B.

It is still another object of the present invention to determine the structure of metabolite 4B.

These and other objects of the present invention will become apparent as the following detailed description proceeds.

According to the method of the present invention, metabolite 4B is produced in vitro by the steps of:

a. preparing a mitochondrial pellet or homogenate of kidney tissues;

b. mixing the pellet with 25-hydroxycholecalciferol;

c. incubating the pellet 25-hydroxycholecalciferol mixture; and d. recovering the metabolite 4B.

The incubation is performed at about 37° C for from about 1.5 to about 4 hours.

Mitochondrial preparations from rachitic or normal fowl, and normal rat, dog, rabbit, monkey, and human kidneys have been capable of producing metabolite 4B.

The method of the present invention will be further understood by reference to the following example.

EXAMPLE 1

White Leghorn cockerels were fed a calciferol deficient diet as described by Hibberd and Norman (Biochem. Pharmacol., 18, 2347 (1969)), and used in the fourth week when they became rachitic. Kidney tissues were removed immediately after sacrifice and placed in ice cold 0.25 M sucrose in 0.1 M $KH_2PO_4$-$K_2HPO_4$ at pH 7.4. Ten percent homogenates were made in a Potter-Elvehjen homogenizer with a Teflon pestle. 3.25 ml were added to an incubation system containing 12 $\mu$moles $MgCl_2$, 600 $\mu$moles potassium phosphate at pH 7.4, 60 $\mu$moles malate, 41.4 $\mu$moles glucose-6-phosphate, 2.6 $\mu$moles nicotinamide adenine dinucleotide phosphate, 5 $\mu$g glucose-6-phosphate dehydrogenase (5 Kornberg units), and 80 to 850 pmoles (1.2 to 13 IU) of 26,27-$^3$H-25-hydroxycholecalciferol, in a final volume of 6 ml. The 26,27-$^3$H-25-hydroxycholecalciferol (specific activity 7.5 Ci/mmole or 196 mCi/mmole) was added to the incubation system in 100 $\mu$l ethanol.

After incubation at 37° C for 1.5 to 4 hours, 15 ml of methanol-chloroform (2:1) were added with mixing and the protein was subsequently removed by centrifuging. The protein pellet was reextracted with methanol-chloroform and the two organic extracts were combined. Chloroform and water were added to the combined extracts to cause a phase separation of aqueous methanol and chloroform. The chloroform soluble lipids were dissolved in hexane for subsequent silicic acid chromatography.

EXAMPLE 2

$^3$H-metabolites produced via incubation in vitro were mixed with $^{14}$C-intestinal metabolites obtained from rachitic chicks which had received 4-$^{14}$C-cholecalciferol. The combined metabolites were chromatographed on a 30 g (1 × 80 cm) silicic acid column. The silicic acid had been activated by heating to 120° C for 24 hours. Elution of the lipids was accomplished with the aid of a 250 ml constant volume mixing chamber to generate successive exponential gradients of solvents with increasing dielectric constants. The mixing chamber was first filled with 250 ml of petroleum ether. The holding chamber was filled successively with 300 ml of 100% diethyl ether, 400 ml of 50% (v/v) 1,2 dichloroethane in diethyl ether, 300 ml of acetone, and 300 ml of 100% methanol.

Rechromatography of $^3$H- and $^{14}$C-metabolite 4B, obtained from the silicic acid column, was carried out on a 20 g (1 × 80 cm) Celite liquid-liquid partition column employing a mobile phase of 20% (v/v) 1,2 dichloroethane saturated with a stationary phase of 90% (V/v) methanol-10% water.

Liquid scintillation counting of $^3$H- and $^{14}$C-steroids was carried out in a Beckman model LS 200 counter. All samples were dissolved in 10 or 15 ml of a counting solution consisting of 5 g of phenylbiphenyl-oxadiazole-1,3,per liter of toluene and counted to 2% error. The number of disintegrations per min of $^3$H and $^{14}$C present in the sample was determined by the use of subsequently added internal standards and a computer program designated to process double label counting data. The internal standards used were $^3$H-toluene (New England Nuclear Corporation) and $^{14}$C-benzene (Nuclear-Chicago) with respective specific activities of 38,500 and 3,940 dpm/10 $\mu$l. Utilizing the specific activites of the parent Vitamin D molecules and the number of chicks used in the experiment, this program also converted the disintegrations per min in the sample to absolute amount (picomoles) of steroid per sample per chick.

Metabolite 4B produced in vitro by kidney homogenates was examined for biological activity in rachitic chicks by the method of Coates and Holdsworth (Brit. J. Nutr., 15, 131 (1961)) as modified by Hibberd and Norman (Biochem. Pharmacol., 18, 2347 (1969)). This assay measures the ability of the test compound to stimulate intestinal calcium transport in vivo.

When 77 pmole of 26,27-$^3$H-25-hydroxycholecalciferol were incubated 1.5 hours with a kidney homogenate, 22% or 17 pmole were converted to a compound which migrates with intestinal metabolite 4B (produced in vivo) when cochromatographed on a silicic acid column.

Inasmuch as this comigration occurred in a gradiant elution system, the apparent comigration of the $^3$H-metabolite obtained from kidney in vitro, and intestinal metabolite 4B obtained in vivo, was critically examined by rechromatography on a Celite liquid-liquid partion column. Celite partion chromatography is capable of separating steroids as closely related as estriol and 16-epiestriol. 77% of the metabolite produced in vitro according to the present invention exactly comigrates with the metabolite 4B produced in vivo in this highly sensitive chromatography system.

The results of a biological assay of metabolite 4B produced in vitro by kidney homogenates are reported in Table 3. The in vitro metabolite 4B was found to be highly biologically active (over 4 times as active as the parent cholecalciferol) in its ability to stimulate intestinal calcium absorption in the rachitic chick. In agreement with earlier results with the intestinal metabolite 4B, the in vitro metabolite 4B is also able to greatly shorten the lag which precedes the transport response. Only 10 hours after administration, the kidney metabolite 4B produced a significant stimulation of calcium transport.

TABLE 3

Biological Assay of in vitro Kidney Metabolite 4B

| Compound tested, nmoles (IU) | Hours [a] | Number of chicks | $^{45}Ca^{++}$ c.p.m./0.20 ml. plasma |
|---|---|---|---|
| Rachitic control | 25 | 4 | [b]207±21 |
| 1.52 (23.4) CC | 25 | 5 | 844±34 |
| 0.76 (11.7) CC | 25 | 5 | 451±107 |
| 0.11 (1.6) Kidney 4B | 25 | 4 | [c]386±95 |
| 0.11 (1.6) Kidney 4B | 10 | 4 | [c]406±80 |

[a] Time in hours between administration of test compound and assays.
[b] Data are reported as the mean ± S.E.M.
[c] P<0.1 above rachitic control.
NOTE.—Kidney Metabolite 4B, obtained in vitro and isolated exactly as described, and standard amounts of CC, were tested for their ability to stimulate intestinal absorption of a dose of 4.0 mg. of $^{40}$ Ca$^{++}$ and $^{45}$Ca$^{++}$ (4$\mu$Ci) by the procedure of Hibberd and Norman. The appearance of $^{45}$Ca$^{++}$ in the blood is measured 30 minutes after placing the $^{45}$Ca$^{++}$ in the intact duodenum.

The following procedure was followed with normal rat, dog, chicken, rabbit, monkey, and human kidneys, and resulted in identifiable metabolite 4B.

EXAMPLE 3

The kidneys from a rachitic animal are removed immediately after sacrifice and placed in ice cold isotonic saline. A crude 10% homogenate is prepared in 0.25 M sucrose. The crude homogenate is then centrifuged at 600 X g; the 600 X g pellet is discarded and the supernant is centrifuged at 8000 Xg. The pellet (operationally defined as the mitochondrial fraction) is resuspended in 0.25 M sucrose at 2 X the volume of the original crude homogenate. 6 ml's of this suspension is added to 300 μmoles tris-Hel, pH 7.4, 25 μmoles $MgCl_2$, 120 μmoles and 2.6 nmoles 25-OH-CC made up to a final volume of 12 ml, in a 30 ml beaker. This is defined as the incubation system. All the preceding procedures were done at 0° C. Also, 25-OH-CC is added in 100 μabsolute ethanol. The incubation system is then incubated for 2 hours at 37° C, and processed as previously described in Example 1.

Having considered the first aspect of the present invention, that is, the preparation of metabolite 4B in vitro, attention is now directed to the second aspect of the present invention, that is, the structural characterization of metabolite 4B. For the first phase of this characterization, White Leghorn cockerels (donated by H and N of California, Inc.) were raised on a rachitogenic diet described previously and utilized in their fourth week. Male weanling rats of the Holtzman strain were housed in individual hanging wire cages and fed the calciferol-free diet No. 11 of Guroff et al. (Amer. J. Physiol., 204, 833 (1963)), for three weeks, at which time they were considered to be calciferol depleted.

The following steroids were employed in the metabolism studies: $4$-$^{14}C$-cholecalciferol (Philips-Duphar, Amsterdam), specific activity 20.8 mCi per mmole; 1, $2$-$^3H$-cholecalciferol (New England Nuclear), specific activity 38.8 mCi per mmole, prepared from $1,2$-$^3H$-cholesterol which was synthesized by the heterogeneous catalytic reduction of cholesta-1, 4-diene-3-one; and $1,2$-$^3H$-cholecalciferol (Amersham/Searle, Inc.), specific activity 577 mCi/mmole, prepared from $1,2^3H$-cholesterol which was synthesized by the homogeneous catalytic reduction of cholesta-1, 4-diene-3-one. In addition, chick intestinal lipids were obtained from E. Kodicek, Director, Dunn Nutritional Laboratory, Cambridge University, Cambridge, England. These lipids were isolated from chicks which had received 0.65 mmoles each of a mixed dose of $1$-$^3H$- and $4$-$^{14}C$-cholecalciferol intracardially 16 hours prior to killing. All solvents and chemicals used were analytical grade.

EXAMPLE 4

Metabolism and lipid extraction techniques.

Groups of 10 to 15 rachitic chicks were dosed intracardially with the indicated amount of a mixed dose of 1, $2$-$^3H$- and $4$-$^{14}C$-cholecalciferol dissolved in 0.2 ml of 1, 2-propanediol, and killed from 15 to 72 hours later. Calciferol-deficient rats were dosed intraperitoneally and killed 24 hours later. Small intestines (duodenum, ileum and jejunum) were removed, slit lengthwise, and rinsed with ice cold 0.25M sucrose in 0.05M Tris-HCl, pH 7.5, 0.025M KCl, and 0.005M $MgCl_2$ (0.25M sucrose-TKM). Total lipids were extracted by the procedure previously described by Myrtle et al [J. Biol. Chem., 245, 1190 (1970)]. This method involves blending the tissue in methanol-chloroform (2:1) in a Waring Blendor. Kidneys were minced and perfused in 0.25M sucrose-TKM prior to lipid extraction. Leg bones (tibia + fibia and femur) were stripped of all muscle and tissue, slit lengthwise, and the marrow removed by scraping. The bones were rinsed in 0.25M sucrose-TKM prior to extraction for lipids. Heparinized blood was collected and extracted directly for total lipids.

Chromatography procedure.

Tissue lipids were dissolved in petroleum ether and applied to a 30 g (1x 80 cm) silicic acid column built in petroleum ether. Cholecalciferol and its metabolites were eluted by exponential gradients of diethyl ether, 1,2-dichloroethane, and methanol exactly as described previously. 10 ml fractions were collected. This chromatography system resolves the tissue radioactivity into three major radioactive compounds; unmetabolized cholecalciferol, the polar derivative 25-OH-cholecalciferol, and the more polar unidentified metabolite, previously designated Metabolite 4B.

Radioactivity determination.

Liquid scintillation counting of tritium and carbon-14 labeled steroids was carried out in a Beckman model CPM 200 counter, equipped with external standardization. All samples were dissolved in 10 ml of a counting solution containing 5 g of phenylbiphenyloxadiazole-1,3,4 per liter of toluene and counted to a minimum 2 percent error. The number of disintegrations of tritium and carbon-14 present in each sample was determined by the use of a computer program designed to process dual label counting data with external standardization.

It has previously been demonstrated that 25-OH-cholecalciferol is an intermediate in the metabolism of cholecalciferol to Metabolite 4B. Thus, the probable metabolic pathway is cholecalciferol → 25-OH-cholecalciferol → Metabolite 4B. As shown in Table 4, the metabolic conversion of 1, $2$-$^3H$-cholecalciferol to Metabolite 4B clearly involves loss of tritium at the second metabolic step. This Table shows a typical experiment examining tritium loss from the parent steroid. 1, $2$-$^3H$-Cholecalciferol (Amersham/Searle) prepared from $1,2$-$^3H$-cholesterol which was synthesized by the homogeneous reduction of cholesta-1, 4-diene-3-one, lost 46 percent of its tritium on conversion to Metabolite 4B in the chick intestine. Metabolite 4B found in the chick skeleton and kidney, and in the rat intestine, also lost comparable amounts of tritium.

TABLE 4

Tritium Loss During the Metabolism of a Mixed Dose of $1,2$-$^3H$- and $4$-$^{14}C$-Cholecalciferol*

| Tissue | $^3H$-$^{14}C$ ratio | | | | Percent loss of tritium in 4B |
|---|---|---|---|---|---|
| | Dose | CC | 25-OH-CC | 4B | |
| Chick: | | | | | |
| Intestine | 3.22 | 3.13 | 3.07 | 1.75 | 46 |
| Skeleton | 3.22 | 3.15 | 3.13 | 1.93 | 40 |
| Blood | 3.22 | 3.10 | 3.21 | 3.40 | 0 |
| Kidney | 3.22 | 2.92 | 3.02 | 1.72 | 47 |
| Rat: | | | | | |
| Intestine | 3.22 | 3.19 | 3.19 | 1.90 | 41 |
| Blood | 3.22 | 3.23 | 3.18 | 2.57 | 20 |

¹ Rachitic chicks received a mixed dose of 0.065 nmole of $1,2$-$^3H$-cholecalciferol (Amersham/Searle, Inc.) and 0.58 nmole of $4$-$^{14}C$-cholecalciferol. Calciferol-deficient rats received 0.13 nmole and 1.17 nmole, respectively, of the identical steroids. Silicic acid chromatography resolved the tissue radioactivity into the parent cholecalciferol (CC), 25-OH-cholecalciferol (25-OH-CC) and Metabolite 4B. The ratios in several minor metabolites also resolved are not shown here.

Several other preparations of tritiated cholecalciferol have also been examined for tritium loss in exactly the same manner, with emphasis on ascertaining the loss of tritium in the production of intestinal Metabolite 4B. The tritium losses observed with three of these preparations are summarized in Table 5. 1, $2$-$^3H$-Cholecalciferol (prepared from $1,2$-$^3H$-cholesterol synthesized by heterogeneous catalytic reduction of cholesta-1, 4-diene-3-one) lost about 17 percent of its tritium on conversion to Metabolite 4B. On the other hand, 1-³H-cholecalciferol lost 86 percent of its tritium. Also included for comparison in Table 5 is the

TABLE 5

Tritium Distribution in 1-³H- and 1,2-³H-Cholesterol and Tritium Loss from 1-³H- and 1,2-³H-Cholecalciferol in the Biosynthesis of Chick Intestinal Metabolite 4B

| | Percent distribution of total tritium | | |
|---|---|---|---|
| | 1,2-³H-cholesterol (homogeneous catalysis) | 1,2-³H-cholesterol (heterogeneous catalysis) | 1-³H-cholesterol |
| Position 1-α | 47-49 | 38-44 | 83-85 |
| Position 1-β | 15-17 | 16-22 | 15-17 |
| Position 2 | 36 | 40 | |

| | Percent tritium loss from metabolite 4B— | | |
|---|---|---|---|
| | 1,2-³H-cholecalciferol (homogeneous catalysis) | 1,2-³H-cholecalciferol (heterogeneous catalysis) | 1-³H-cholecalciferol |
| Metabolite 4B | 45±1.4ᵃ (2) | 17±2.6ᵃ (6) | 86 |

ᵃThe data are given as the mean ± the standard deviation.
*Determined in experiments similar to those reported in Table 4. Rachitic chicks receiving 0.13 nmole and 1.17 nmole respectively of 1,2-³H-cholecalciferol (homogeneous catalysis) and 4-¹⁴C-cholecalciferol, were killed 18 hours after intracardiac administration. Rachitic chicks receiving 0.98 nmoles each of 1,2-³H-cholecalciferol (heterogeneous catalysis) and 4-¹⁴C-cholecalciferol were killed from 15 to 72 hours after administration of the steroid. The numbers in parentheses indicate the number of separate determinations.

distribution of tritium in the tritiated cholesterols used as synthetic precursors to these three preparations of tritiated cholecalciferol. In comparing the percent tritium lost from tritiated cholecalciferol with the reported distribution of tritium in the cholesterol precursor to cholecalciferol, it is clear that one of the two hydrogens at the carbon-1 position is lost during the production of Metabolite 4B. Both 1, 2-³H-cholecalciferol (homogeneous catalysis) and 1-³H-cholecalciferol lost an amount of tritium which corresponds to the tritium at the 1-α position. 1, 2-³H-Cholecalciferol (heterogeneous catalysis) lost an amount of tritium corresponding to that reported to be present at the 1-β position.

As shown in Table 4, Metabolite 4B retains the ¹⁴C label at the carbon-4 position, but loses tritium. The amount of tritium lost is dependent upon the preparation of tritiated cholecalciferol examined (Table 5). In two of the three preparations examined, the formation of Metabolite 4B involves the loss of tritium from the 1-α position; in the third preparation, the loss corresponds closest to the 1β tritium.

The reason for the apparent loss of the 1-β hydrogen from 1, 2-³H-cholecalciferol (heterogeneous catalysis) as opposed to the 1-α hydrogen in the two other preparations is not clear. It may be that in this instance the tritium distribution in the cholecalciferol is not the same as that in the cholesterol from which it was derived (heterogeneous catalysis). This could result from photochemically or thermally induced hydrogen migrations during the synthesis of this preparation of cholecalciferol, producing a redistribution of the tritium molecules at the carbon-1 position, or even a relocation of some of the tritium molecules. Certainly, such hydrogen migrations are possible, and have been well established in similar photochemical and thermal reactions.

Considering the chromatographic position of migration of Metabolite 4B relative to cholecalciferol and its 25-hydroxy derivative, and considering the relative migrations of other steroids it seems probable that the formation of 4B involves the addition of a single oxygen function to 25-OH-cholecalciferol. If the addition of such an oxygen function to the steroid is concomitant with the observed tritium loss, as seems likely, considerable information about the structure of Metabolite 4B can be deduced. If the oxygen function is introduced at the carbon-1 or carbon-2 position, a maximum of six structures for 4B can be proposed, as shown below. One structure, 1,25-diOH-cholecalciferol (alternatives), best fits the tritium loss data. The four

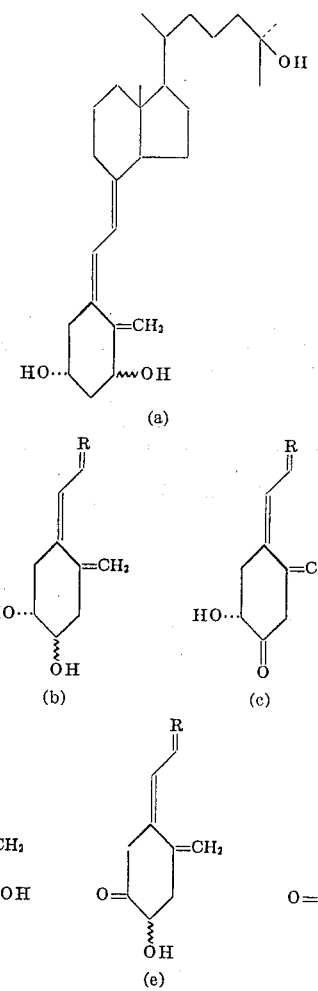

Possible structures of Metabolite 4B as derived from tritium loss data.

structures with a carbon-2 oxygen function (b,c,e,f) are difficult to reconcile with the additional tritium lost from the carbon-1 position. Also, the three structures with a 3-keto group (d,e,f,) are perhaps unlikely on the basis that converting the 3-hydroxyl into a keto group rendered cholecalciferol inactive. The introduction of an oxygen function in the steroid at other than the carbon-1 or -2 positions is also possible, but this would require, in addition, either some type of rearrangement of the double bonds in the molecule or the introduction of an additional double bond leading to the specific loss of a carbon-1 hydrogen. While these alternative seem less likely, they cannot be definitely excluded at this point.

Another possible structure is

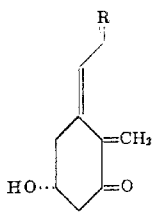

Thus, the possible structures can be represented by the general formula:

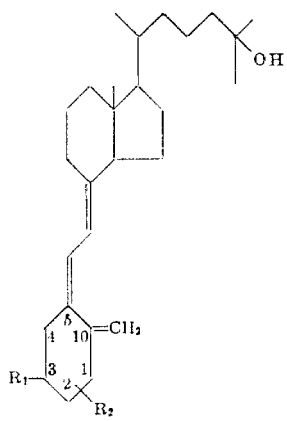

wherein $R_1$ represents OH or O; and $R_2$ represents 1-OH, 1-O, 2-OH, 2-O, or a 1-2 double bond; with the probable structure being $R_1 = $ OH and $R_2 = $ 1-OH or 1-O, the most probable having an OH in the 1- position.

Although the intestine is by far the richest source of metabolite 4B, owing to the low absolute amounts of the metabolite present it has proved difficult to isolate enough metabolite 4B from the intestine to permit its complete chemical characterization. Since metabolite 4B produced from a kidney homogenate incubation is both chromatographically identical with and has biological activity equivalent to metabolite 4B obtained from chick intestinal mucosa, and can be produced in vitro in large enough quantities, the complete chemical characterization can now be accomplished.

EXAMPLE 5

Microgram quantities of metabolite 4B were prepared for mass spectrometric analysis in the following manner. Kidneys were obtained from groups of approximately 20 rachitic white Leghorn cockerels (24 days old), and 10 percent homogenates were made in 0.25 M sucrose. With this homogenate a series of 50 incubations each containing 2.5 nmole of [26,27-³H]25-OH-CC (specific activity 196 mc/mmole) and a reduced nicotinamide adenine dinucleotide phosphate (NADPH) generating system in 12 ml was performed as described previously. After incubation at 37° C for 2 hours, 45 ml of methanol-chloroform (2:1) was added to each incubation to obtain total lipids. This lipid extract was subjected to extensive chromatography to obtain essentially pure metabolite 4B. The yield of metabolite 4B from such a series of incubations followed by chromatograpy has varied from 4 to 8 µg. In the chromatography procedure the lipid was applied in diethyl either to a 30 g ( 1 by 80 cm) column of silicic acid. The column was batch eluted sequentially with 200 ml of 100 percent diethyl ether (25-hydroxycholecalciferol), 300 ml of 50 percent diethyl ether in dichloroethane (vol/vol) (metabolite 4B), and 200 ml of 100 percent methanol (other polar metabolites). The metabolite 4B fractions were concentrated under nitrogen and applied to a 20g (1 by 80 cm) Celite liquid-liquid partition column which was eluted with a mobile phase of 20 percent (vol/vol) 1,2-dichloroethane and 80 percent petroleum ether saturated with a stationary phase of methanol-water (90:10 by volume) as described previously (2). The methabolite 4B was eluted after 700 to 800 ml, concentrated under nitrogen, and subjected to silica gel thin-layer chromatography. The silica gel had been prewashed with 100 percent acetone, followed by 100 percent diethyl ether, and dried, and the plates were preeluted with 100 percent ethyl acetate to remove trace lipids. After application of the metabolite 4B sample to the plate, it was developed with ethyl acetate: petroleum ether (93:7). In this system cholecalciferol, 25-hydroxycholecalciferol, and metabolite 4B have $R_F$'s of 0.89, 0.76, and 0.45, respectively. The metabolite 4B was eluted from the gel with redistilled 100 percent methanol, and concentrated under nitrogen prior to mass spectrometric analysis.

Mass spectra were obtained with an AEI MS-902 high-resolution mass spectrometer. The samples were introduced into the ion source on a direct insertion probe at source temperatures between 150° and 230° C above ambient. The mass spectra of metabolite 4B samples were obtained by increasing the ion source temperature up to 230° C so as to fractionate the sample while at the same time continuously scanning the molecular ion region for the appearance of the m/e 416 (molecular ion 416). High-resolution spectra of metabolite 4B were taken at a resolving power of 1:10,000. The data for 1,25-diOH-CC is the observed spectrum from which contributing unknown contaminants have been omitted. In Table 6 are presented the structures of the three compounds CC, 25-OH-CC and 1,25-OH-CC and a tabulation of the important fragments produced in the mass spectrometer.

TABLE 6

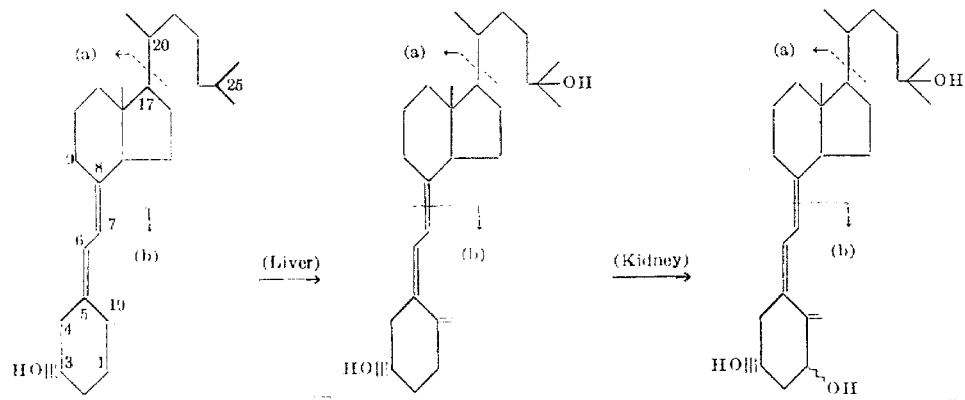

| Cholecalciferol (vitamin $D_3$) | 25-hydroxycholecalciferol (25-OH-vitamin $D_3$) | 1,25-dihydroxycholecalciferol (1,25-diOH-vitamin $D_3$) |
|---|---|---|
| Emp. formula $C_{27}H_{44}O$ | $C_{27}H_{44}O_2$ | $C_{27}H_{44}O_3$ |
| Molecular wt. 384 | 400 | 416 |
| (a) 271 | 271 | 287 |
| (b) 136 | 136 | 152 |

NOTE.—Structures of cholecalciferol (vitamin $D_3$) and its two metabolites with a tabular evaluation of their fragmentation patterns.

It was known that CC and 25-OH-CC have one and two oxygen atoms, respectively. Thus the finding that the parent molecular ions of CC, 25-OH-CC, and metabolite 4B were at m/e of 384, 400, and 416, respectively, suggested that metabolite 4B had only one more oxygen atom than 25-OH-CC and two more oxygen atoms than CC. The presence of three oxygen atoms was confirmed by high-resolution mass spectra determination of metabolite 4B. The molecular weight of metabolite 4B was found experimentally to be 416.32900, which is in good agreement with the expected mass of 416.32903 for $C_{27}H_{44}O_3$.

Since 25-OH-CC ($C_{27}H_{44}O_2$) had served as a substrate in the homogenate incubation for the production of metabolite 4B and since it was believed that metabolite 4B contained only one additional functional group which made it more polar than 25-OH-CC, it seemed probable that two of the three oxygen atoms of metabolite 4B were still present at their original carbon-3 and carbon-25 positions. Furthermore, since the metabolism, in vivo, of mixed doses of [1,2-$^3$H] CC or [1-$^3$H] CC and [4-$^{14}$C] CC results in the stereospecific loss of tritium from the carbon-1 position in the formation of metabolite 4B. These results strongly sugest that the additional oxygen atom present in metabolite 4B is introduced at carbon-1. Since the molecular formula of metabolite 4B is $C_{27}H_{44}O_3$, this means that the additional oxygen atom had to be present at carbon-1 as a hydroxyl group rather than as a ketone. These suggestions were confirmed by comparison of the fragments of the three compounds.

The mass spectra of CC and 25-OH-CC both give fragments at m/e 271 which results from loss of the side chain due to cleavage of the bond between carbon 17 and 20, while metabolite 4B gives a fragment at m/e 287 (271 + 16). Thus the additional oxygen atom in metabolite 4B is not associated with the side chain. Both CC and 25-OH-CC give intense peaks at m/e 136. All molecules so far examined which have an intact triene structure with Δ 5–6, 7–8, 10–19 double bonds given this characteristic fragment which results from cleavage of the bonds between carbons 7 and 8. Both CC and 25-OH-CC gave a peak at m/e 118 (136-18) associated with the loss of water from this fragment containing ring A of the steroid nucleus. Metabolite 4B gave intense peaks at m/e of 152 (136 + 16) and 134 (152 − $H_2O$). Thus the additional oxygen atom known to be associated with metabolite 4B is unequivocably present in the ring A fragment, since the m/e 136 ion is shifted by 16 mass units to m/e 152. Also, the presence of the m/e 152 and 134 fragments is consistent with retention of the triene structure characteristic of CC (Vitamin D) present in metabolite 4B. Carbons 1, 2 and 4 are the only possible positions in the ring A fragment for the position of the additional hydroxyl. Consideration of the stereospecific loss of tritium from the α-position of carbon-1 in the production of metabolite 4B indicates that the additional hydroxyl group of metabolite 4B is located at carbon-1. Thus the structure of metabolite 4B has ben established to be 1,25-dihydroxycholecalciferol.

Additional data of the mass spectrum of metabolite 4B which are consistent with this structure assignment include the ions at m/e of 398, 380, and 362 which correspond to the loss of one, two, and three molecules of $H_2O$ from the molecular ion m/e 416 and the peaks at m/e of 269 and 251 resulting from the loss of one and two molecules of $H_2O$ from the m/e 287 fragment. In a similar fashion CC had a fragment at m/e 366 (384 − $H_2O$), and 25-OH-CC had peaks at m/e 382 (400 − $H_2O$) and 364 (382 − $H_2O$).

It should be apparent from the foregoing detailed description that the objects set forth hereinabove have been successively achieved. Moreover, while there is shown and described a present preferred embodiment of the invention, it is to be distinctly understood that the invention is not limited thereto but may be otherwise variously embodied and practiced with the scope of the following claims.

What is claimed is:

1. A method of producing a biologically active polar metabolite of Vitamin $D_3$ comprising the steps of:
   a. making a mitochondrial preparation of kidney tissues from an animal selected from the group consisting of rachitic or normal fowl, and normal rats, dogs, rabbits, monkeys, and humans;
   b. mixing said preparation with 25-hydroxycholecalciferol to form an incubation mixture;
   c. incubating said mixture; and
   d. recovering said metabolite.

2. A method as defined in claim 1 wherein said animal is rachitic.

3. A method as defined in claim 2 wherein said animal is a rachitic fowl and said preparation is a kidney homogenate.

4. A method as defined in claim 3 wherein said fowl is a cockerel.

5. A method as defined in claim 1 wherein said incubation is performed at about 37° C for from about 1.5 to about 4 hours.

6. A method as defined in claim 1 wherein making said preparation comprises the steps of:
   a. removing said tissues from said fowl immediately after sacrifice;
   b. placing said tissues in 0.25 M sucrose in 0.1 M phosphate buffer at pH 7.4; and
   c. homogenizing said tissues in said sucrose-buffer solution to a tissue concentration of about 10 percent, to thereby form a homogenate.

7. A method as defined in claim 6 further comprising the steps of:
   a. centrifuging said homogenate to obtain a mitochondrial fraction pellet;
   b. resuspending said pellet in 0.25 M sucrose to form a suspension; and
   c. adding said suspension to said 25-hydroxycholecalciferol to form said incubation mixture.

8. A method as defined in claim 1 wherein said incubation is performed in the presence of a reduced nicotinamide adenine dinucleotide phosphate generating system.

9. A method as defined in claim 1 further comprising extracting the total lipids after said incubation and prior to said recovery.

10. A method as defined in claim 1 wherein said metabolite is separated from said total lipids by silicic acid chromatography.

* * * * *